UNITED STATES PATENT OFFICE.

WILLIAM RINTOUL AND THOMAS JOSEPH NOLAN, OF STEVENSTON, SCOTLAND, ASSIGNORS TO NOBEL'S EXPLOSIVES COMPANY LIMITED, OF STEVENSTON, AYRSHIRE, SCOTLAND.

GELATINIZATION OF CELLULOSE NITRIC ESTERS IN THE MANUFACTURE OF EXPLOSIVES.

1,348,741.     Specification of Letters Patent.     Patented Aug. 3, 1920.

No Drawing.     Application filed May 19, 1919. Serial No. 298,135.

*To all whom it may concern:*

Be it known that we, WILLIAM RINTOUL and THOMAS JOSEPH NOLAN, both subjects of the King of Great Britain, residing at Ardeer Factory, Stevenston, Ayrshire, Scotland, have invented certain new and useful Improvements Relating to the Gelatinization of Cellulose Nitric Esters in the Manufacture of Explosives, of which the following is a specification.

This invention relates to the gelatinization of cellulose nitric esters in the manufacture of explosives.

In British Patent No. 12743 of 1912 it has been shown that all members of the class of chemical substances known as urethanes possess the property of stabilizing nitric esters. Again in British Patent No. 4941 of 1913, it has further been shown that these bodies are capable of being used as gelatinizing agents in the preparation of nitric esters explosives. Further work in connection with this class of bodies has led to the discovery of a subclass of the urethanes which possess certain important advantages as gelatinizing or gelatinizing and stabilizing agents over members of other sub-classes of the urethanes. This sub-class is characterized by containing attached to the nitrogen two aromatic groups, one of which is a benzyl or substituted benzyl group. For example, if benzyl anilin or benzyl ortho-toluidin is acted upon by ethyl chlorformate either in alcoholic solution containing sodium carbonate in suspension or in presence of an aqueous solution of sodium carbonate, there are produced substances which have been identified as phenyl benzyl urethane and benzyl-ortho-tolyl urethane depending on the nature of amin employed. These new substances are slightly yellow viscous oils, having a faint odor. Phenyl benzyl urethane boils at 185–190° C. at 10 mm. pressure, while benzyl-ortho-tolyl urethane boils at 195° C at 11 mm. pressure. The members of this sub-class possess all the characteristics of an ideal gelatinizing and stabilizing body in a high degree and have the further advantage that the simpler and more effective members of the group are readily manufactured from raw materials which are easily obtainable.

The invention consists in nitrocellulose containing explosives for propellent, blasting or detonant purposes having as ingredients one or more members of the sub-class of urethanes characterized by containing attached to the nitrogen atom two aromatic groups, one of which is a benzyl or substituted benzyl group with or without the addition of subsidiary gelatinizing and/or stabilizing agents.

The invention also consists in gelatinizing cellulose nitric esters or materials containing the same in the manufacture of explosives by the aid of the said sub-class of urethanes.

In carrying this invention into effect by way of example, we prepare the urethanes from the corresponding secondary amins by suspending the latter in an aqueous solution of sodium carbonate, or dissolving them in alcohol containing the requisite amount of sodium carbonate in suspension and adding ethyl chlorformate. According to one method of preparing the urethanes we proceed as follows:—39 parts of ethyl chlorformate are slowly added to 61 parts of benzyl anilin suspended in a 15% aqueous solution of sodium carbonate warmed to about 40° C. The phenyl benzyl urethane formed separates as a viscous oil, which can be purified from the admixed benzyl anilin by extraction with warm dilute hydrochloric or other acid, and subsequently purified.

These urethanes may also be prepared by the methods applicable to urethanes as a class, viz., for example, by the action of sodium ethylate upon phenyl benzyl urea chlorid or by the action of benzyl chlorid on the sodium derivative of phenyl urethane, phenyl benzyl urethane may be prepared.

As examples of non-solvent colloidal propulsive nitroglycerin explosives prepared by the use of these substances alone or together with other gelatinizing or stabilizing agents, we would quote the following:—

For a powder which is to be produced in the form of a cord, tube, strip or the like, we have found the following composition to be satisfactory:—

Nitroglycerin _____ 45%
Soluble nitrocellulose containing 12.2% nitrogen _____ 45%
Benzyl ortho-tolyl urethane _____ 10%

We find the following compositions to be suitable for the production of powders which are required to be produced in flake form:—

(a) Nitroglycerin ................ 41%
 Soluble nitrocellulose containing
  12.2% nitrogen............. 50%
 Phenyl benzyl urethane........ 9%
(b) Nitrogylcerin ................ 41%
 Soluble nitrocellulose containing
  12.2% nitrogen............. 50%
 Benzyl para-tolyl urethane.... 8.5%
 Ethyl beta-naphthyl ether .... 0.5%
(c) Nitroglycerin ................ 41%
 Soluble nitrocellulose containing
  12.2% nitrogen............. 50%
 Phenyl benzyl urethane........ 8%
 Diphenyl urethane............. 1%

These compositions have been found to possess the same ballistic properties as the British service explosive cordite M. D. It is to be understood that they can be modified very considerably to give other required ballistic results.

The explosives described may be manufactured according to the methods given in British Patent No. 4940 of 1913.

We also find that the members of this sub-class of urethanes may be used with advantage over other compounds in preparing the detonator colloidal explosives described in British specification No. 6481 of 1917, substituting these members for the gelatinizing and stabilizing agents otherwise used. They may also be used in the preparation of blasting explosives by the methods described in British specifications Nos. 14655/15 and 16616/16.

Having now described our invention, what we claim as new and desire to secure by Letters Patent is:—

1. Nitrocellulose containing explosives for propellent, blasting or detonant purposes, having as ingredients at least one member of the sub-class of urethanes characterized by containing attached to the nitrogen atom two aromatic groups, one of which is a benzyl group.

2. Nitrocellulose containing explosives for propellent, blasting or detonant purposes, having as ingredients at least one member of the sub-class of urethanes characterized by containing attached to the nitrogen atom two aromatic groups, one of which is a benzyl group with the addition of a subsidary gelatinizing agent.

3. Nitrocellulose containing explosives for propellent, blasting or detonant purposes, having as ingredients at least one member of the sub-class of urethanes characterized by containing attached to the nitrogen atom two aromatic groups, one of which is a benzyl group with the addition of a subsidary stabilizing agent.

4. Nitrocellulose containing explosives for propellent, blasting or detonant purposes, having as ingredients at least one member of the sub-class of urethanes characterized by contaning attached to the nitrogen atom two aromatic groups, one of which is a benzyl group with the addition of a subsidary combined gelatinizing and stabilizing agent.

5. Nitrocellulose containing explosives for propellent, blasting or detonant purposes, having as ingredients a plurality of members of the sub-class of urethanes characterized by containing attached to the nitrogen atom two aromatic groups, one of which is a benzyl group.

6. In the gelatinization of cellulose nitric esters in the manufacture of explosives the process which consists in effecting the gelatinization of the cellulose nitric esters or materials containing the same by the aid of a member of the sub-class of urethanes containing two aromatic groups attached to the nitrogen element, one of which is a benzyl group.

7. In the gelatinization of cellulose nitric esters in the manufacture of explosives the process which consists in effecting the gelatinization of the cellulose nitric esters or materials containing the same by the aid of a plurality of members of the sub-class of urethanes containing two aromatic groups attached to the nitrogen element, one of which is a benzyl group.

8. An explosive containing nitrocellulose and phenyl benzyl urethane.

9. Nitrocellulose containing explosives for propellent, blasting or detonant purposes having as ingredients at least one member of the subclass of urethanes characterized by containing attached to the nitrogen atom two aromatic groups one of which is a benzyl group and an organic ether.

10. The improved explosives substantially in the following proportions:—

Nitroglycerin ........................... 41%
Soluble nitrocellulose containing 12.2%
 nitrogen............................. 50%
Phenyl benzyl urethane.................. 9%

11. The improved explosives substantially in the following proportions:

Nitroglycerin ........................... 41%
Soluble nitrocellulose containing 12.2%
 nitrogen............................. 50%
Phenyl benzyl urethane.................. 8%
Diphenyl urethane....................... 1%

In testimony whereof we have signed our names to this specification.

WILLIAM RINTOUL.
THOMAS JOSEPH NOLAN.